United States Patent
LeGendre et al.

(10) Patent No.: US 9,739,673 B2
(45) Date of Patent: Aug. 22, 2017

(54) SENSOR SUBSTRATE

(71) Applicant: Sensata Technologies, Inc., Attleboro, MA (US)

(72) Inventors: Andrew LeGendre, Dedham, MA (US); Cory Bousquet, Cranston, RI (US); Neil Petrarca, Warwick, RI (US)

(73) Assignee: Sensata Technologies, Inc., Attleboro, MA (US)

( * ) Notice: Subject to any disclaimer, the term of this patent is extended or adjusted under 35 U.S.C. 154(b) by 87 days.

(21) Appl. No.: 14/818,964

(22) Filed: Aug. 5, 2015

(65) Prior Publication Data

US 2017/0038268 A1 Feb. 9, 2017

(51) Int. Cl.
*G01L 1/22* (2006.01)
*G01L 3/10* (2006.01)
*G01B 5/30* (2006.01)
*G01B 7/16* (2006.01)
*G01L 1/04* (2006.01)

(52) U.S. Cl.
CPC ............... *G01L 3/108* (2013.01); *G01B 5/30* (2013.01); *G01B 7/18* (2013.01); *G01L 1/048* (2013.01)

(58) Field of Classification Search
CPC . G01L 3/108; G01L 3/10; G01L 5/161; G01L 3/08; G01L 3/12; G01L 3/1457; G01L 5/06; G01L 1/04; G01L 3/24
USPC ...... 73/862.338, 862.325, 862.004, 862.321, 73/862.324, 862.191, 862.471, 862
See application file for complete search history.

(56) References Cited

U.S. PATENT DOCUMENTS

| | | | | |
|---|---|---|---|---|
| 8,887,580 | B2* | 11/2014 | Nishikawa | G01L 3/101 73/862.331 |
| 8,893,562 | B2* | 11/2014 | Barraco | G01L 3/102 73/862 |
| 2007/0193362 | A1* | 8/2007 | Ferguson | G01B 11/165 73/800 |
| 2013/0004116 | A1 | 1/2013 | Ruggiero et al. | |
| 2014/0216173 | A1* | 8/2014 | Chana | G01L 3/108 73/862.338 |
| 2014/0345374 | A1* | 11/2014 | Morselli | F16H 59/16 73/115.02 |

OTHER PUBLICATIONS

European Search Report for EP Serial No. 16182088.1 dated Dec. 13, 2016 from the European Patent Office in Munich, Germany, 8 pages.

* cited by examiner

*Primary Examiner* — Lisa Caputo
*Assistant Examiner* — Nigel Plumb
(74) *Attorney, Agent, or Firm* — Burns & Levinson LLP; George N. Chaclas; Daniel McGrath

(57) ABSTRACT

In an embodiment, a sensor substrate includes a first end, a second end, and a body. The body contains provisions for accommodating one or more sense elements. The first end and the second end contain attachment points for attaching the sensor substrate to a shaft. In addition, the first end and the second end include curved portions. For a particular end, a spacing of the attachment points and/or a depth of the curved portion may define, in part, a flexibility of the end. This flexibility may be used to control a sensitivity of the sense elements.

20 Claims, 4 Drawing Sheets

SENSOR SUBSTRATE

BACKGROUND

Strain may be viewed as an amount of deformation of a body due to an applied force. The amount of deformation may be a fractional change in the length of the body. Strain can be positive (tensile) or negative (compressive).

Strain can be measured using various methods. In many applications, strain gauges are used to measure strain. For example, strain gauges are often used to measure torque or other forces in an automobile that may cause strain on components in the automobile.

Strain gauges may come in various forms. One common form of strain gauge is a metallic strain gauge. A typical metallic strain gauge varies its electrical resistance in proportion to an amount of strain in the gauge.

More specifically, a metallic strain gauge typically contains a very fine wire or metallic foil arranged in a grid. The grid may maximize an amount of metallic wire or foil that may be subject to strain. A cross-sectional area of the grid may be minimized to reduce an effect of shear strain and Poisson Strain. As strain is applied to the grid, the resistance of the grid may change. An amount of change in the resistance of the grid may be proportional to an amount of strain applied to the grid.

BRIEF DESCRIPTION OF DRAWINGS

The accompanying drawings, which are incorporated in and constitute a part of this specification, illustrate one or more embodiments described herein and, together with the description, explain these embodiments. In the drawings.

DETAILED DESCRIPTION

A sensor substrate is a substrate that carries one or more sensors. The sensors may sense various conditions, such as physical conditions. For example, a sensor substrate may contain one or more strain gauges that are bonded to the sensor substrate. The sensor substrate may be attached to a shaft. The strain gauges may sense a strain (e.g., torque) applied to the shaft.

Example embodiments described herein include a sensor substrate that carry one or more strain gauges. The sensor substrate may be attached to a shaft that may be part of a torque sensor. The sensor substrate may include attachment points that attach the substrate to the shaft. The attachment points may be tuned (e.g., adjusted) to accommodate sensing a strain applied to the shaft.

Figure 1:
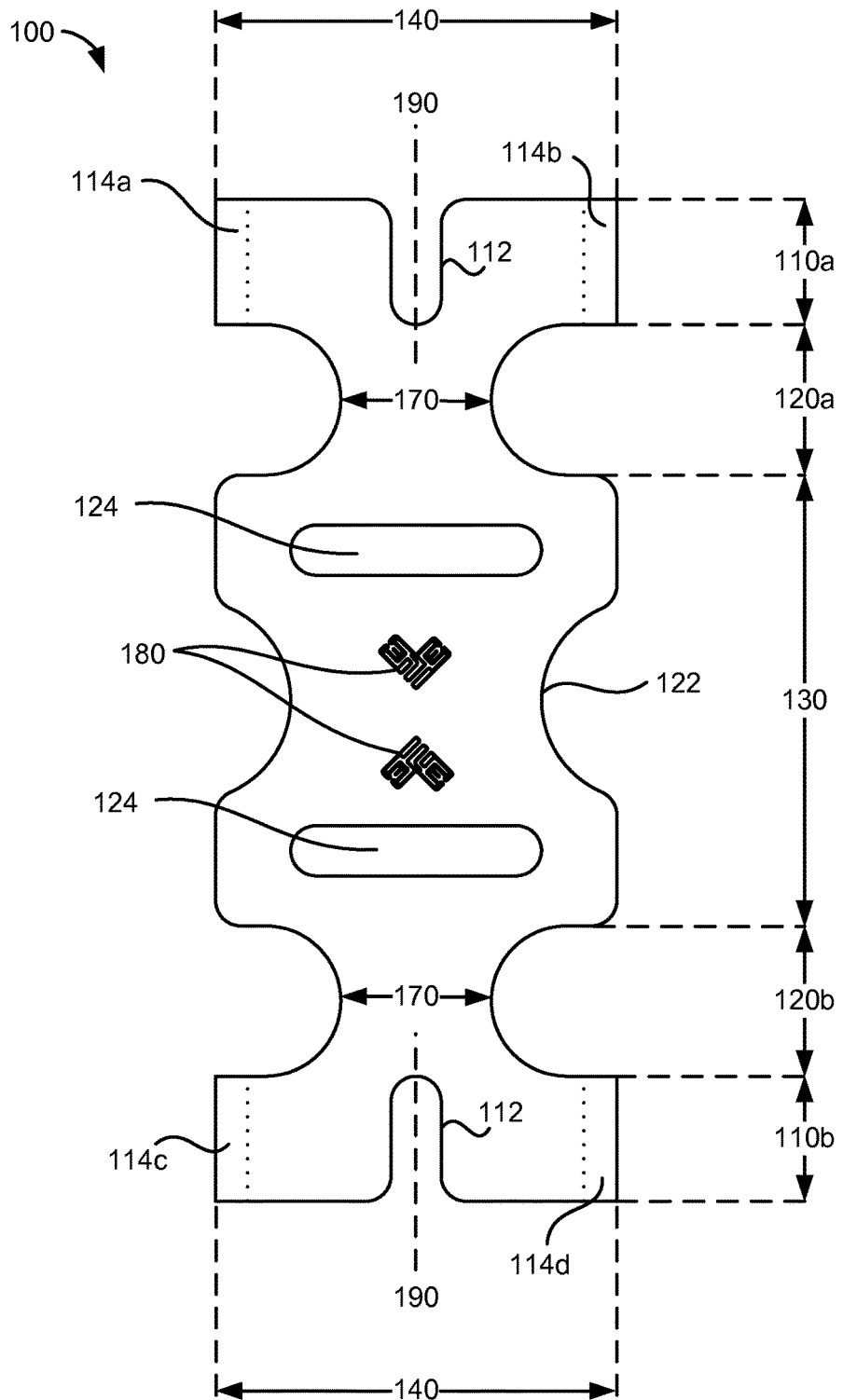
FIG. 1 illustrates an example embodiment of a sensor substrate.

FIG. 1 illustrates an example embodiment of a sensor substrate 100 having a plurality of sense elements 180. Referring to FIG. 1, the sensor substrate 100 contains a first end 110a, a first neck 120a, a main body 130, a second neck 120b, and a second end 110b.

Note that the first end 110a is opposite the second end 110b. The first end 110a may be referred to as a proximal end and the second end 110b may be referred to as a distal end.

Also note that FIG. 1 illustrates an example embodiment of a sensor substrate 100. Other embodiments of sensor substrate 100 may include more features or fewer features than the features illustrated in FIG. 1.

The first end 110a and the second end 110b include attachment points 114 and a curved portion 112. The curved portion 112 may be provided to accommodate attaching the sensor substrate 100 to a device, such as a shaft. For example, the curved portion 112 may be used to align the sensor substrate 100 on a device during an attachment process that involves attaching the sensor substrate 100 to the device.

The attachment points 114 may be spaced a predefined distance 140. The distance 140 may define an amount of strain transferred into an end 110. For example, as will be described further below, the sensor substrate 100 may be attached to a shaft. Distance 140 may be defined to make the first end 110a and/or the second end 110b responsive to various forces that may be applied to the shaft. Based on distance 140, the sensor substrate 100 may flex a predetermined amount in response to a certain force applied to the shaft.

The distance 140 may be a distance between the outer sides of the attachment points 114. For example, the distance 140 for attachment point 114a and attachment point 114b may be the distance between the sides of attachment point 114a and attachment point 114b that are farthest from a center axis 190 of the sensor substrate 100.

The first neck 120a and the second neck 120b may be shaped to enhance flexibility of the sensor substrate 100. The flexibility provided by the necks 120a-b may be adjusted to control the flexing of the sensor substrate 100.

For example, distance 170 represents a width of a neck 120. The distance 170 of the first neck 120a may be adjusted (e.g., increased, decreased) to control a flexing of the first end 110a after a certain force is applied to the first end 110a. Likewise, the distance 170 of the second neck 120b may be adjusted to control a flexing of the second end 110b after a certain force is applied to the second end 110b. In addition to or alternatively, the first neck 120a and the second neck 120b may be curved or otherwise shaped to control a flexing of the first end 110a and the second end 110b, respectively, after forces are applied to those ends 110a-b.

The first neck 120a may be positioned between the first end 110a and a first side of the main body 130. The second neck 120b may be positioned between the second end 110b and a second side of the main body 130. The first side and the second side of the main body 130 may be at opposite ends of the main body.

The shape and/or width of the first neck 120a may define an amount of strain transferred from the first end 110a to the first side of the main body 130. Moreover, the shape and/or width of the second neck 120b may define an amount of strain transferred from the second end 110b to the second side of the main body 130.

The shape of the necks 120a-b and/or the distance 140 may be tuned (e.g., adjusted) to define an amount of strain at the sense elements 180. For example, suppose a force is applied to the first end 110a. The first end 110a may flex in response to the force. The flexing may be transmitted via the sensor substrate 100 to the sense elements 180 which may sense the force based on the flexing.

Now suppose it is determined that the sense elements 180 are not sensitive enough to detect certain forces that are applied to the first end 110a. A distance 140 between the attachment points 114a-b and/or a shape of the neck 120a at the first end 110a may adjusted to enable the first end 110a to flex a predetermined amount when the forces are applied. Adjusting may involve, for example, widening the distance 140 at the first end 110a and/or increasing the depth of the neck 120a. The adjustments may cause sufficient flexing of the sensor substrate 100 such that the sense elements 180 are able to detect the previously undetectable forces and therefore cause the sensitivity of the sense elements 180 to increase. The main body 130 may include provisions for accommodating the sense elements 180. These provisions may include a flat portion that may accept (receive) the sense elements 180. For example, the main body 130 may include a platform that may be substantially flat. The sense elements 180 may be bonded (e.g., glass bonded) to the platform.

The main body 130 may also include one or more curved portions 122 and/or one or more openings 124. A shape of the curved portions 122 and/or openings 124 may be, for example, defined, in part, based on a desired flexibility of the main body 130. It should be noted that other criteria may be used to define the shape of the curved portions 122 and/or openings 124. For example, the curved portions 122 and/or openings 124 may be used to accommodate aligning the sensor substrate 100 on a device during an attachment process that involves attaching the sensor substrate 100 to the device. It should be noted that other embodiments of the main body 130 may exclude the curved portions 122 and/or openings 124 or contain other provisions for aligning the sensor substrate 100 and/or providing a desired flexibility to the main body 130. It should be further noted that other embodiments of sensor substrate 100 may, for example, have different shaped ends, necks, and/or main bodies.

Figure 2:
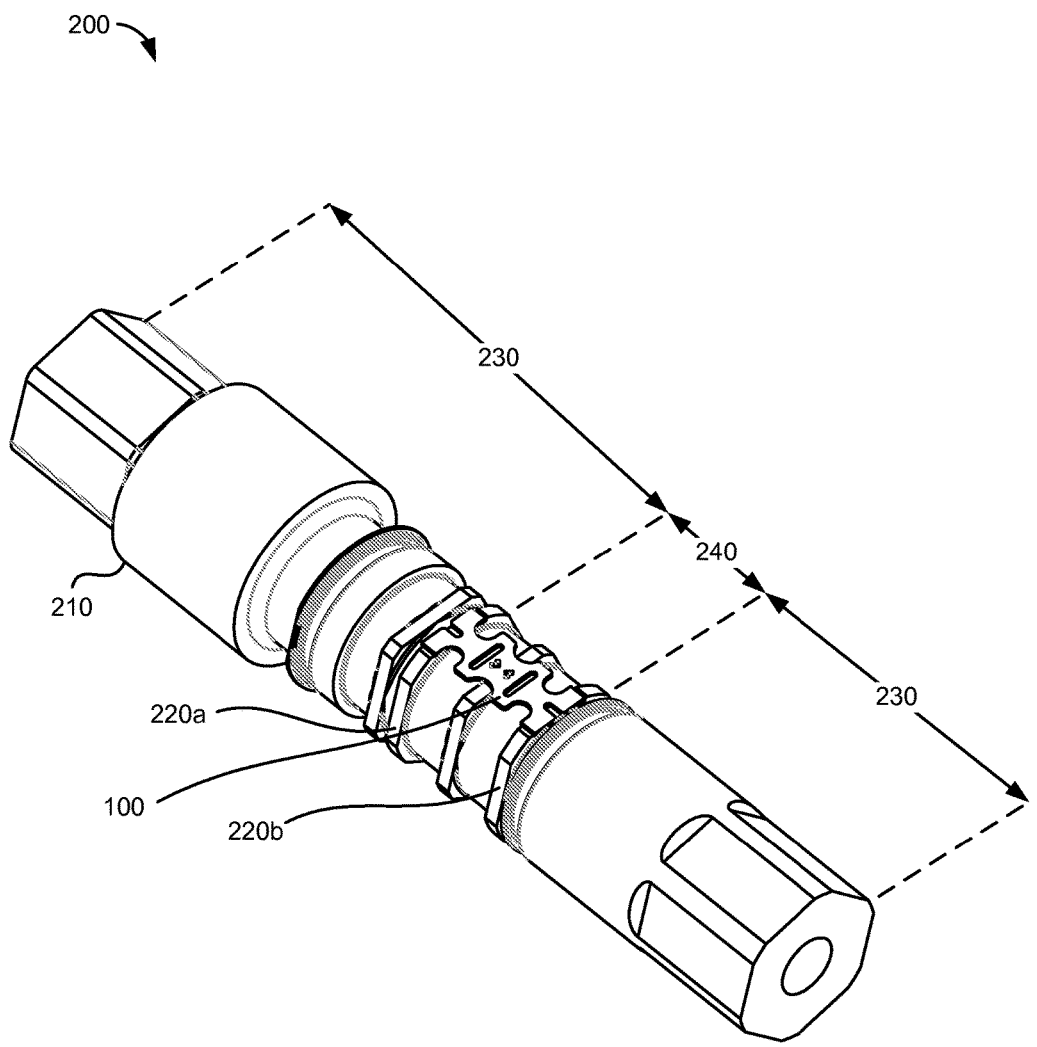
FIG. 2 illustrates an example mounting of the sensor substrate.

FIG. 2 illustrates an example mounting 200 of the sensor substrate 100. Referring to FIG. 2, the sensor substrate 100 may be mounted, for example, to a shaft 210. The shaft 210 may be part of a torque sensor. The shaft 210 may include a main portion 230 and an attachment zone 240. The sensor substrate may be attached to the shaft 210 within the attachment zone 240.

The attachment zone 240 may include one or more platforms 220a-b (e.g., rings), which, inter alia, may accommodate attaching the sensor substrate 100 to the shaft 210. The platforms 220a-b may be formed by cutting grooves in the shaft 210. In an embodiment, the platforms 220a-b contain one or more flat portions and the attachment points 114 of the sensor substrate 100 are attached to the shaft 210 at one or more of the flat portions.

The sensor substrate 100 may be attached to the platforms 220a-b using a welding technique, such as, for example resistance welding. It should be noted however, that other techniques for attaching the sensor substrate 100 to the platforms 220a-b may be used. These techniques may include but are not limited to crimping, riveting, bonding, and clamping.

Platforms 220a-b may act to reduce stress at the attachment zone 240. Moreover, having flat portions on platforms 220a-b may act to isolate the attachment points 114 from the main portion 230 of the shaft 210.

Figure 3:
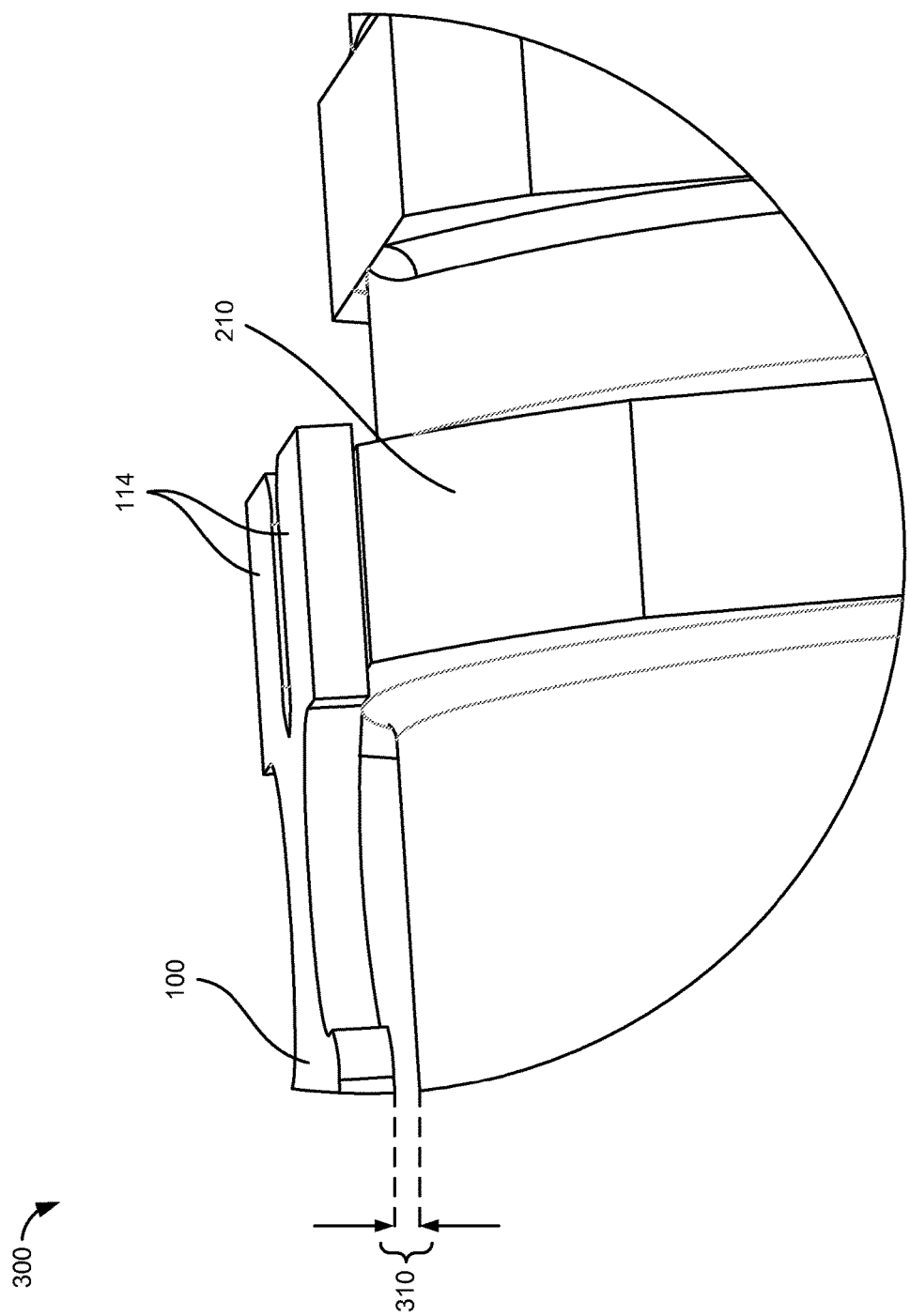
FIG. 3 illustrates a close-up view of the mounted sensor substrate.

FIG. 3 illustrates a close-up view 300 of the mounted sensor substrate 100. Referring to FIG. 3 and as noted above, a platform 220 may contain one or more flat portions. The sensor substrate 100 may be attached to a flat portion of the platform 220 at the attachment points 114. The main body 130 of the attached sensor substrate 100 may be raised above the shaft 210 to distance the main body 130 from the shaft at a distance 310. Raising the main body 130 from the shaft 210 may create a gap between the main body 130 and the shaft 210. The gap may act to isolate the sensor substrate 100 from additional and/or undesired strain that may be introduced by the shaft 210 to the sensor substrate 100 if the gap did not exist.

Figure 4:
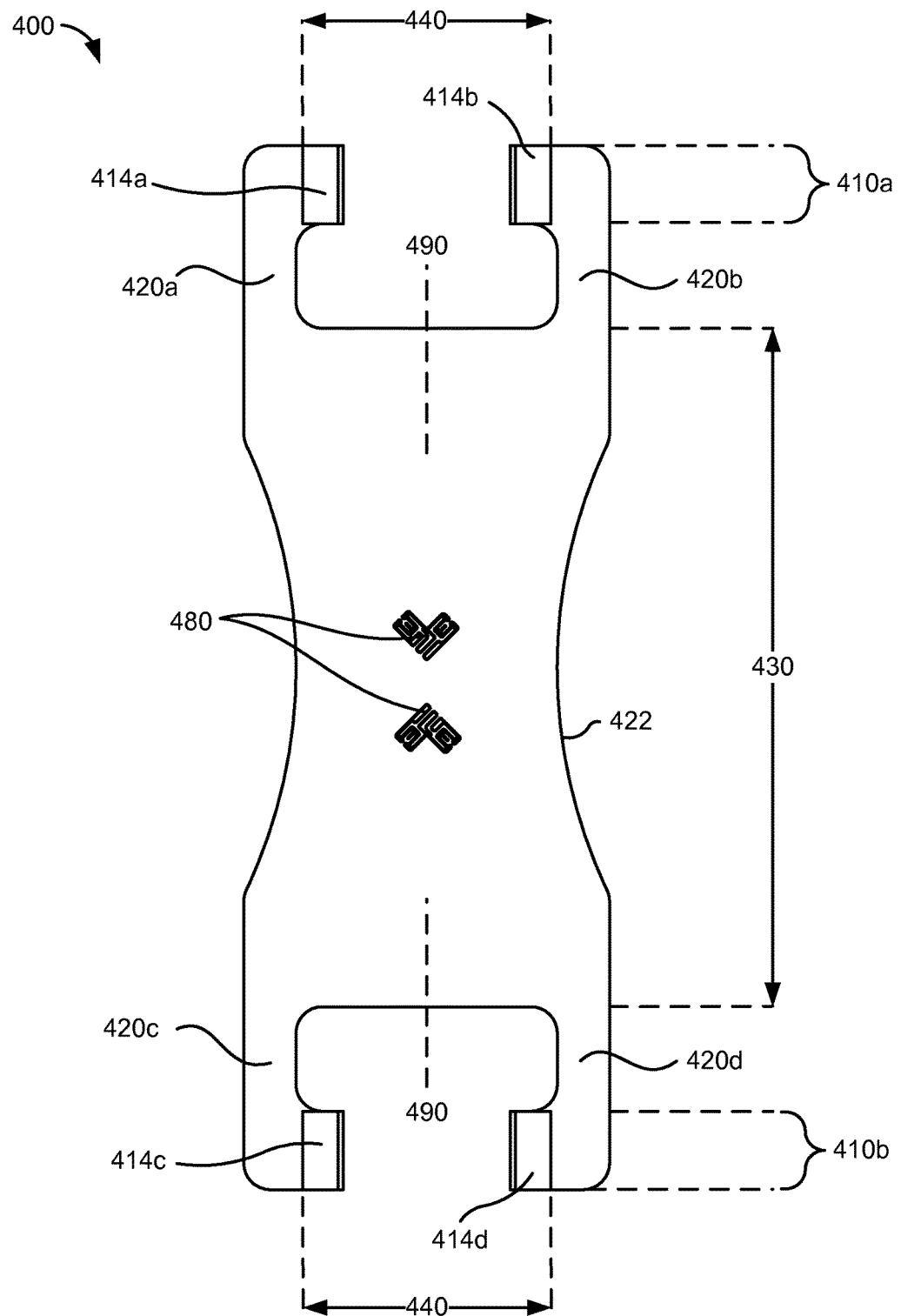
FIG. 4 illustrates another example embodiment of a sensor substrate.

FIG. 4 illustrates another example embodiment of a sensor substrate 400 with sense elements 480. Referring to FIG. 4, sensor substrate 400 contains a first end 410a, a second end 410b, a necks 420a-d, and a main body 430.

Note that the first end 410a is opposite the second end 410b. The first end 410a may be referred to as a proximal end and the second end 410b may be referred to as a distal end.

The first end 410a and the second end 410b include attachment points 414. The attachment points 414 may be spaced a predefined distance 140. The distance 440 may define an amount of strain transferred into an end 410. For example, the sensor substrate 100 may be attached to a shaft, such as shaft 210 (FIG. 2). Distance 440 may be defined to make the first end 410a and/or the second end 410b responsive to various forces that may be applied to the shaft. Based on distance 440, the sensor substrate 400 may flex a predetermined amount in response to a certain force applied to the shaft.

The distance 440 may be a distance between the outer sides of the attachment points 414. For example, the distance 440 for attachment point 414a and attachment point 414b may be the distance between the sides of attachment point 414a and attachment point 414b that are closest to a center axis 490 of the sensor substrate 400.

The necks 420a-d may be shaped to enhance flexibility of the sensor substrate 400. The flexibility provided by the necks 420a-d may be adjusted to control the flexing of the sensor substrate 400.

For example, the widths and/or lengths of necks 420a-b may be adjusted (e.g., increased, decreased) to control a flexing of the first end 410a after a certain force is applied to the first end 410a.

The necks 420a-b and/or the distance 440 may be tuned (e.g., adjusted) to define an amount of strain transmitted to sense elements 480 that may be attached to the sensor substrate 400. For example, suppose a force is applied to the first end 410a. The first end 410a may flex in response to the force. The flexing may be transmitted via the sensor substrate 400 to sense elements 480 which may sense the force based on the flexing.

Now suppose it is determined that the sense elements 480 are not sensitive enough to detect certain forces that are applied to the first end 410a. A distance 440 between the attachment points 414a-b and/or a shape of the necks 420a-b at the first end 410a may be adjusted to enable the first end 410a to flex a predetermined amount when the forces are applied. Adjusting may involve, for example, widening the distance 440 at the first end 410a and/or increasing the width and/or length of the necks 420a-b. The adjustments may cause sufficient flexing of the sensor substrate 100 such that the sense elements 480 are able to detect the previously undetectable forces and therefore cause the sensitivity of the sense elements 480 to increase.

The main body 430 may include provisions for accommodating sense elements 480. The sense elements 480 may sense a strain placed on the sensor substrate 400. The provisions provided by the main body 430 may include a flat portion that may accept (receive) the sense elements 480. For example, the main body 430 may include a platform that may be substantially flat. The sense elements 480 may be bonded (e.g., glass bonded) to the platform.

The main body 430 may include one or more curved portions 422. A shape of the curved portions 422 may be, for example, defined, in part, based on a desired flexibility of the main body 430. It should be noted that other criteria may be used to define the shape of the curved portions 422. For example, the curved portions 422 may be used to align the sensor substrate 400 on a device for attachment to the device. It should be noted that other embodiments of the main body 430 may exclude the curved portions 422 and/or include other features, such as, for example, openings. It should be further noted that other embodiments of sensor substrate 400 may, for example, have different shaped ends, necks, and/or main bodies.

The foregoing description of embodiments is intended to provide illustration and description but is not intended to be exhaustive or to limit the invention to the precise form disclosed. Modifications and variations are possible in light of the above teachings or may be acquired from practice of the invention.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A sensor substrate for isolating at least one sensor from a device comprising:
    a main body containing provisions for accommodating the at least one sensor;
    a first end connected to the main body via a first neck, the first end having a first attachment point and a second attachment point for attaching to the device, a distance between the first attachment point at the first end and the second attachment point at the first end defining an amount of strain transferred into between the device and the first end; and
    a second end connected to the main body via a second neck, the second end
    having a first attachment point and a second attachment point for attaching to the device, a distance between the first attachment point at the second end and the second attachment point at the second end defining an amount of strain transferred between the device and into the second end, wherein the main body is isolated from the device such that undesired strain through the device is not introduced to the at least one sensor.

2. The sensor substrate of claim 1, wherein
    the first neck has a width that is less than a width of the first end, the width of the first neck defining an amount of strain transferred from the first end to the main body.

3. The sensor substrate of claim 2, wherein:
    the second neck has a width that is less than a width of the second end, the width of the second neck defining an amount of strain transferred from the second end to the main body.

4. The sensor substrate of claim 1, wherein the first end includes one or more provisions to accommodate aligning the sensor substrate around a center axis of the device.

5. The sensor substrate of claim 4, wherein the one or more provisions of the first end include a curved portion around the center axis.

6. The sensor substrate of claim 5, wherein the second end includes one or more provisions to accommodate aligning the sensor substrate around the center axis.

7. The sensor substrate of claim 6, wherein the one or more provisions of the second end include a curved portion around the center axis.

8. The sensor substrate of claim 1, wherein the main body includes one or more provisions to accommodate aligning the sensor substrate around a center axis of the device.

9. The sensor substrate of claim 8, wherein the one or more provisions of the main body include a curved portion around the center axis.

10. The sensor substrate of claim 8, wherein the one or more provisions of the main body include one or more openings.

11. The sensor substrate of claim 1, wherein the sensor substrate is attached to the device at: the first attachment point and the second attachment point of the first end; and the first attachment point and the second attachment point of the second end.

12. The sensor substrate of claim 1, wherein the device is a shaft.

13. The sensor substrate of claim 12, wherein the shaft is part of a torque sensor.

14. The sensor substrate of claim 12, wherein the sensor substrate is attached to the shaft such that a gap exists between the main body and the shaft.

15. The sensor substrate of claim 14, wherein the gap acts to isolate the sensor substrate from at least one of additional and undesired strain introduced by the shaft to the sensor substrate if the gap did not exist.

16. A sensor substrate comprising:
    a first end having a plurality of attachment points for attaching the substrate to a device;
    a second end having a plurality of attachment points for attaching the substrate to the device;
    a main body extending between the first and second ends;
    a first neck connected to the first end and a first side of the main body, a width of the first neck controlling an amount of strain transferred from the first end to the main body in response to a force applied to the first end; and
    a second neck connected to second end and a second side of the main body, the second side being opposite the first side, a width of the second neck controlling an amount of strain transferred from the second end to the main body in response to a force applied to the second end,
    wherein when the first end and the second end are attached to the device, a gap exists between the main body and the device, the gap acting to isolate the sensor substrate from at least one additional and undesired strain introduced by a strain on the device.

17. The sensor substrate of claim 16, wherein:
    at least one distance between the plurality of attachment points of the first end defines, in part, the amount of strain transferred into the first end from the device.

18. The sensor substrate of claim 17, wherein:
    at least one distance between plurality of attachment points of the second end defines, in part, the amount of strain transferred into the second end from the device.

19. The sensor substrate of claim 16, wherein the device is a shaft.

20. The sensor substrate of claim 19, wherein the shaft is part of a torque sensor.

* * * * *

UNITED STATES PATENT AND TRADEMARK OFFICE
CERTIFICATE OF CORRECTION

PATENT NO. : 9,739,673 B2
APPLICATION NO. : 14/818964
DATED : August 22, 2017
INVENTOR(S) : Andrew LeGendre, Cory Bousquet and Neil Petrarca It is certified that error appears in the above-identified patent and that said Letters Patent is hereby corrected as shown below:

In Column 5, Line 10 (Claim 1), the portion of the line reading "transferred into between the device" should read – transferred between the device –

Signed and Sealed this
Eighteenth Day of September, 2018

Andrei Iancu
*Director of the United States Patent and Trademark Office*